US007089068B2

(12) United States Patent
Fay et al.

(10) Patent No.: US 7,089,068 B2

(45) Date of Patent: Aug. 8, 2006

(54) SYNTHESIZER MULTI-BUS COMPONENT

(75) Inventors: Todor J. Fay, Bellevue, WA (US); Brian L. Schmidt, Bellevue, WA (US); James F. Geist, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 09/802,111

(22) Filed: Mar. 7, 2001

(65) Prior Publication Data

US 2002/0128737 A1 Sep. 12, 2002

(51) Int. Cl.
*G06F 17/00* (2006.01)
*G10H 7/00* (2006.01)

(52) U.S. Cl. .......................................... 700/94; 84/645

(58) Field of Classification Search .................. 84/645, 84/600, 601, 602; 700/94; 710/100, 101, 710/123, 112

See application file for complete search history.

(56) References Cited

U.S. PATENT DOCUMENTS

| | | | | |
|---|---|---|---|---|
| 5,142,961 | A | 9/1992 | Paroutaud | |
| 5,303,218 | A | 4/1994 | Miyake | |
| 5,315,057 | A | 5/1994 | Land et al. | |
| 5,511,002 | A | 4/1996 | Milne et al. | |
| 5,548,759 | A | 8/1996 | Lipe | |
| 5,717,154 | A * | 2/1998 | Gulick | 84/604 |
| 5,734,119 | A | 3/1998 | France et al. | |
| 5,761,684 | A | 6/1998 | Gibson | |
| 5,768,545 | A * | 6/1998 | Solomon et al. | 710/310 |
| 5,778,187 | A * | 7/1998 | Monteiro et al. | 709/231 |
| 5,792,971 | A | 8/1998 | Timis et al. | |
| 5,842,014 | A | 11/1998 | Brooks et al. | |
| 5,852,251 | A | 12/1998 | Su et al. | |
| 5,890,017 | A * | 3/1999 | Tulkoff et al. | 710/65 |
| 5,902,947 | A | 5/1999 | Burton et al. | |
| 5,942,707 | A | 8/1999 | Tamura | |
| 5,977,471 | A | 11/1999 | Rosenzweig | |
| 6,100,461 | A * | 8/2000 | Hewitt | 84/603 |
| 6,152,856 | A | 11/2000 | Studor et al. | |
| 6,169,242 | B1 | 1/2001 | Fay et al. | |
| 6,173,317 | B1 | 1/2001 | Chaddha et al. | |
| 6,175,070 | B1 | 1/2001 | Naples et al. | |
| 6,216,149 | B1 | 4/2001 | Conner et al. | |
| 6,225,546 | B1 | 5/2001 | Kraft et al. | |
| 6,233,389 | B1 * | 5/2001 | Barton et al. | 386/46 |
| 6,357,039 | B1 | 3/2002 | Kuper | |

(Continued)

OTHER PUBLICATIONS

A. Reilly et al., "Interactive DSP Debugging in the Multi-Processor Huron Enviornment", ISSPA pp. 270-273 (Aug. 1996).

(Continued)

*Primary Examiner*—Sinh Tran
*Assistant Examiner*—Andrew C. Flanders
(74) *Attorney, Agent, or Firm*—Lee & Hayes, PLLC

(57) ABSTRACT

An audio generation system produces streams of audio wave data and routes the audio wave data to audio buffers via logic buses that correspond respectively to the audio buffers. A logic bus, or buses, are assigned to an audio wave data source. Additionally, a logic bus corresponds to an audio buffer. Thus, any streams of audio wave data generated by the audio wave data source are routed to the audio buffer corresponding to the logic bus. A logic bus can receive streams of audio wave data from multiple sources, and route the multiple audio wave data streams to an audio buffer. Additionally, an audio buffer can receive streams of audio wave data from multiple logic buses.

52 Claims, 5 Drawing Sheets

U.S. PATENT DOCUMENTS

| | | | | |
|---|---|---|---|---|
| 6,433,266 | B1 | 8/2002 | Fay et al. | |
| 6,541,689 | B1 | 4/2003 | Fay et al. | |
| 6,628,928 | B1 * | 9/2003 | Crosby et al. | 455/77 |
| 6,658,309 | B1 | 12/2003 | Abrams et al. | |
| 2001/0053944 | A1 * | 12/2001 | Marks et al. | 700/94 |
| 2002/0108484 | A1 | 8/2002 | Arnold et al. | |

OTHER PUBLICATIONS

D. Meyer, "Signal Processing Architecture for Loudspeaker Array Directivity Control", ICASSP vol. 2 pp. 16.7.1-16.7.4 (Mar. 1985).

M. Berry, "An Introduction to GrainWave", Computer Music Journal vol. 23, No. 1 pp. 57-61 (Spring 1999).

Harris et al.; "The Application of Embedded Transputers in a Professional Digital Audio Mixing System"; IEEE Colloquium on "Transputer Applications"; Digest No. 129, 2/1-3 (uk Nov. 13, 1989).

Moorer, James; "The Lucasfilm Audio Signal Processor"; Computer Music Journal, vol. 6, No. 3, Fall 1982, 0148-9267/82/030022-11; pp. 22 through 32.

Vercoe, Barry; "New Dimensions in Computer Music"; Trends & Perspectives in Signal Processing; Focus, Apr. 1982; pp. 15 through 23.

Vercoe, et al; "Real-Time CSOUND: Software Synthesis with Sensing and Control"; ICMC Glasgow 1990 for the Computer Music Association; pp. 209 through 211.

Waid, Fred; "APL and the Media"; Proceedings of the Tenth APL as a Tool of Thought Conference; held at Stevens Institue of Technology, Hoboken, New Jersey, Jan. 31, 1998: pp. 111 through 122.

Wippler, Jean-Claude; "Scripted Documents"; Proceedings of the 7th USENIX Tcl/TKConference; Austin Texas; Feb. 14-18, 2000; The USENIX Association.

Malham et al., "3-D Sound Spatialization using Ambisonic Techniques" Computer Music Journal Winter 1995 vol. 19 No. 4 pp. 58-70.

Stanojevic et al., "The Total Surround Sound (TSS) Processor" SMPTE Journal Nov. 1994 vol. 3 No. 11 pp. 734-740.

Piche et al., "Cecilia: A Production Interface to Csound", Computer Music Journal, Summer 1998, vol. 22, No. 2, pp. 52-55.

Miller et al., "Audio-Enhanced Computer Assisted Learning and Computer Controlled Audio-Instruction", Computer Education, Pergamon Press Ltd., 1983, vol. 7, pp. 33-54.

Ulianich V. , "Project FORMUS: Sornoric Space-time and the Artistic Synthesis of Sound" Leonardo 1995 vol. 28 No. 1 pp. 63-66.

Cohen et al., "Multidimensional Audio Window Management" Int. J. Man-Machine Studies 1991 vol. 34 No. 3 pp. 319-336.

Nieberle et al. ,"CAMP: Computer-Aided Music Processing" Computer Music Journal Summer 1991 vol. 15 No. 2 pp. 33-40.

Camurri et al., "A Software Architecture for Sound and Music Processing" Microprocessing and Microprogramming Sep. 1992 vol. 35 pp. 625-632.

Dannenberg et al., "Real-Time Software Synthesis on Superscalar Architectures" Computer Music Journal Fall 1997 vol. 21 No. 3 pp. 83-94.

Meeks H. ,"Sound Forge Version 4.0b" Social Science Computer Review Summer 1998 vol. 16 No. 2 pp. 205-211.

* cited by examiner

Background

SYNTHESIZER MULTI-BUS COMPONENT

RELATED APPLICATIONS

This application is related to a concurrently-filed U.S. Patent Application entitled "Audio Generation System Manager", to Todor Fay and Brian Schmidt, which is identified as Ser. No. 09/801,922, the disclosure of which is incorporated by reference herein.

This application is also related to a concurrently-filed U.S. Patent Application entitled "Accessing Audio Processing Components in an Audio Generation System", to Todor Fay and Brian Schmidt, which is identified as Ser. No. 09/801,938, the disclosure of which is incorporated by reference herein.

This application is also related to a concurrently-filed U.S. Patent Application entitled "Dynamic Channel Allocation in a Synthesizer Component", to Todor Fay, which is identified as Ser. No. 09/802,323, the disclosure of which is incorporated by reference herein.

TECHNICAL FIELD

This invention relates to audio processing and, in particular, to interfacing a synthesizer component with audio buffer components.

BACKGROUND

Multimedia programs present data to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated with electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources for streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other methods of controlling a synthesizer.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run time rather than stored in memory. The data describing an instrument can be downloaded to a synthesizer and then played like any other MIDI instrument. Because DLS data can be distributed as part of an application, developers can be sure that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

Conventional Audio and Music System

FIG. 1 illustrates a conventional audio and music generation system 100. The audio system 100 includes two discrete components, DirectMusic® 102 and DirectSound® 104. DirectMusict® and DirectSound® are application programming interfaces (APIs) available from Microsoft Corporation, Redmond Wash. DirectSound® plays prerecorded digital samples, typically from wave files, and DirectMusic® plays synthesized audio in response to MIDI files or preauthored musical segments.

The audio system 100 includes a synthesizer 106 having a synthesizer channel 108. Typically, a synthesizer is implemented in computer software, in hardware as part of a computer's internal sound card, or as an external device such as a MIDI keyboard or module. The synthesizer channel 108 is an audio data or communications path that represents a destination for a MIDI instruction. The channel 108 has a left and right audio data output, and a reverb audio data output. The reverb output is input to a reverb component 110, and the left and right audio data outputs are input to a left or right input component 112 and 114, respectively. The output of the reverb 110 is a stereo pair that is also input to the left or right input component 112 and 114, respectively. The synthesizer output 116 is a stereo pair that is input to a mixing component 118.

A MIDI instruction, such as a "note-on", directs a synthesizer 106 to play a particular note, or notes, on a synthesizer channel 108 having a designated instrument. The General MIDI standard defines standard sounds that can be combined and mapped into the sixteen separate instrument and sound channels. A MIDI event on a synthesizer channel corresponds to a particular sound and can represent a keyboard key stroke, for example. The "note-on" MIDI instruction can be generated with a keyboard when a key is pressed and the "note-on" instruction is sent to synthesizer 106. When the key on the keyboard is released, a corresponding "note-off" instruction is sent to stop the generation of the sound corresponding to the keyboard key.

The audio system 100 includes a buffer component 120 that has multiple buffers 122(1 . . . n). The output of the mixing component 118 associated with synthesizer channels 108 is input to one buffer 122(2) in the buffer component 120. A buffer in this instance is typically an allocated area of memory that temporarily holds sequential samples of audio data that will be subsequently delivered to an audio rendering device such as a speaker.

An application program typically communicates with synthesizer 106 via some type of dedicated communication interface, commonly referred to as an API. In the audio system 100, an application program delivers audio content or other music events to the synthesizer 106. The audio content and music events are represented as data structures containing information about the audio content and music events such as pitch, relative volume, duration, and the like. Audio events are message-based data, such as MIDI files or musical segments, authored with an external device.

Sound effects can be implemented with a synthesizer, but the output is constrained to the stereo pair 116. For music generation, only having the ability to process audio in a synthesizer can be sufficient. In an audio system that supports both music and sound effects, however, a single output pair input to one buffer is a limitation to creating and enhancing the sound effects.

SUMMARY

An audio generation system produces streams of audio wave data and routes the audio wave data to audio buffers. The audio wave data is routed to the audio buffers via logic buses that correspond respectively to the audio buffers. A synthesizer, multiple synthesizers, and/or other streaming audio data sources produce the streams of audio wave data.

An audio buffer has one or more corresponding logic buses that route the audio wave data to the buffer. Each logic bus is assigned, or designated, to receive audio wave data from a source. When the source produces streams of audio wave data, the data is input to the assigned or designated logic buses.

A logic bus receives the audio wave data and routes it to the audio buffer corresponding to the logic bus. A logic bus can receive streams of audio wave data from multiple sources, and route the multiple audio wave data streams to an audio buffer. Additionally, an audio buffer can receive streams of audio wave data from multiple logic buses.

BRIEF DESCRIPTION OF THE DRAWINGS

The same numbers are used throughout the drawings to reference like features and components.

DETAILED DESCRIPTION

The following description describes systems and methods to manage and route streams of audio wave data in an audio processing system. Audio wave data can be stored as a resource or generated by a synthesizer. Buffers receive and store the streams of audio wave data until it is recalled and processed or delivered to an audio rendering device such as a speaker. A multi-bus component is instantiated to route the streams of audio wave data generated by a synthesizer, or synthesizers, to the buffers. The configuration of the multi-bus component allows a stream of audio data output from a synthesizer to be routed to any number of buffers.

Exemplary Audio Generation System

Figure 1:
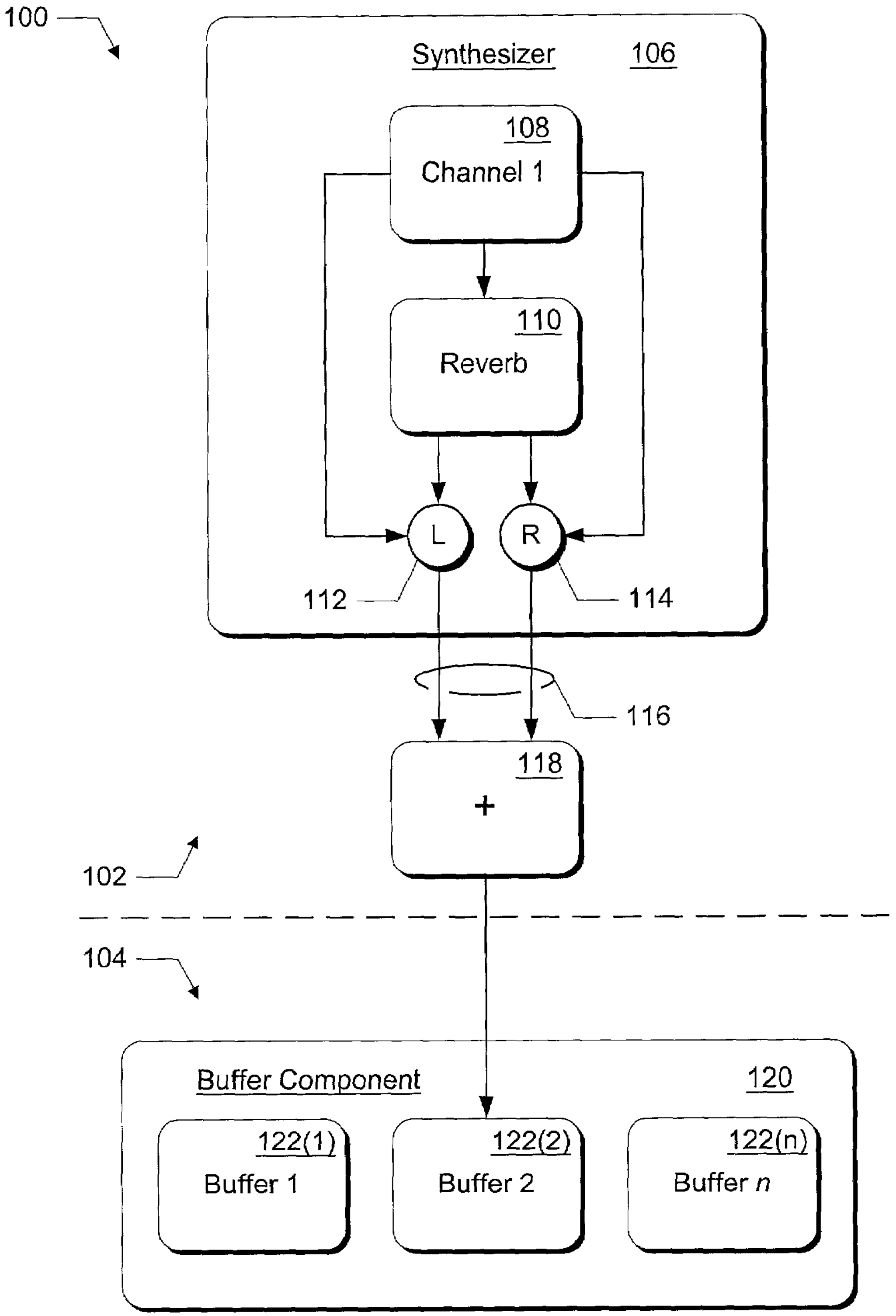
FIG. 1 is a block diagram that illustrates a conventional music generation system.
Figure 2:
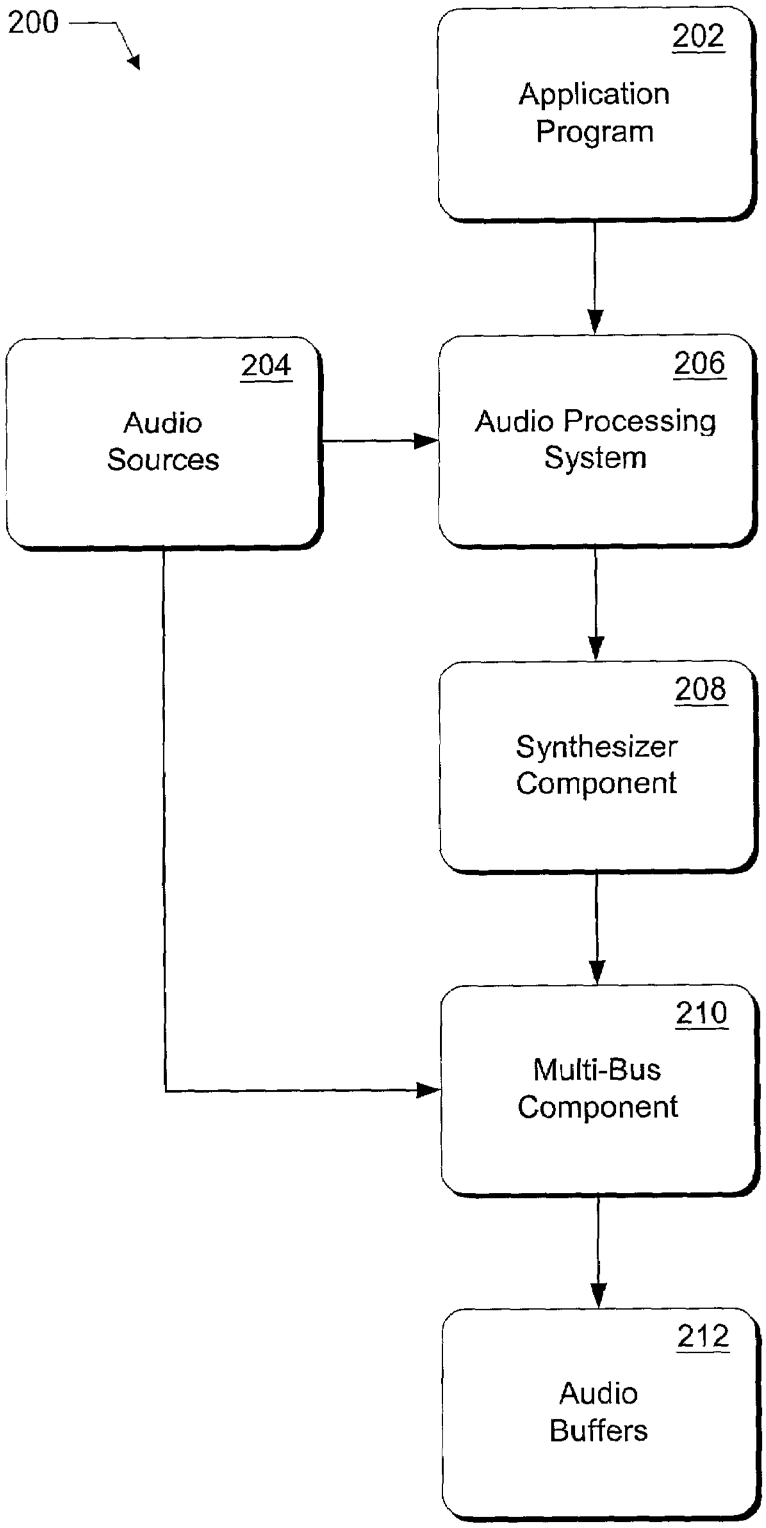
FIG. 2 is a block diagram that illustrates components of an audio generation system.

FIG. 2 illustrates an audio generation system 200 having components that can be implemented within a computing device, or the components can be distributed within a computing system having more than one computing device. See the description of "Exemplary Computing System and Environment" below for specific examples and implementations of network and computing systems, computing devices, and components that can be used to implement the invention described herein.

Audio generation system 200 includes an application program 202, audio sources 204, and an audio processing system 206. Application program 202 is one of a variety of different types of applications, such as a video game program, some other type of entertainment program, or an application that incorporates an audio representation with a video presentation.

Audio sources 204 supply digital samples of audio data such as from a wave file (i.e., a .wav file), message-based data such as from a MIDI file or a preauthored segment file, or an audio sample such as a Downloadable Sound (DLS). Although not shown, the audio sources 204 can be stored in the application program 202 as a resource rather than in a separate file.

Application program 202 initiates that an audio source 204 be loaded and processed by the audio processing system 206. The application program 202 interfaces with the other components of the audio generation system 200 via application programming interfaces (APIs). The various components described herein are implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that the audio generation systems and the various components described herein are not limited to a COM and/or OLE implementation, or to any other specific programming technique.

The audio processing system 206 converts an audio source 204 to a MIDI message format. Additional information regarding the audio data processing components described herein can be found in the concurrently-filed U.S. Patent Application entitled "Audio Generation System Manager", which is incorporated by reference above. However, any audio processing system can be used to produce audio instructions for input to the audio generation system components.

The audio generation system 200 includes a synthesizer component 208, a multi-bus component 210, and audio buffers 212. Synthesizer component 208 receives formatted MIDI messages from the audio processing system 206 and generates sound waveforms that can be played by a sound card, for example. The audio buffers 212 receive the audio wave data (i.e., sound waveforms) generated by the synthesizer 208 and streams the audio wave data in real-time to an audio rendering device. An audio buffer 212 can be designated in hardware or in software.

The multi-bus component 210 routes the audio wave data from the synthesizer component 208 to the audio buffers 212. The multi-bus component 210 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal. Additional information regarding the audio data processing components described herein can be found in the concurrently-filed U.S. Patent Application entitled "Dynamic Channel Allocation in a Synthesizer Component", which is incorporated by reference above.

Exemplary Synthesizer Multi-Bus Component

Figure 3:
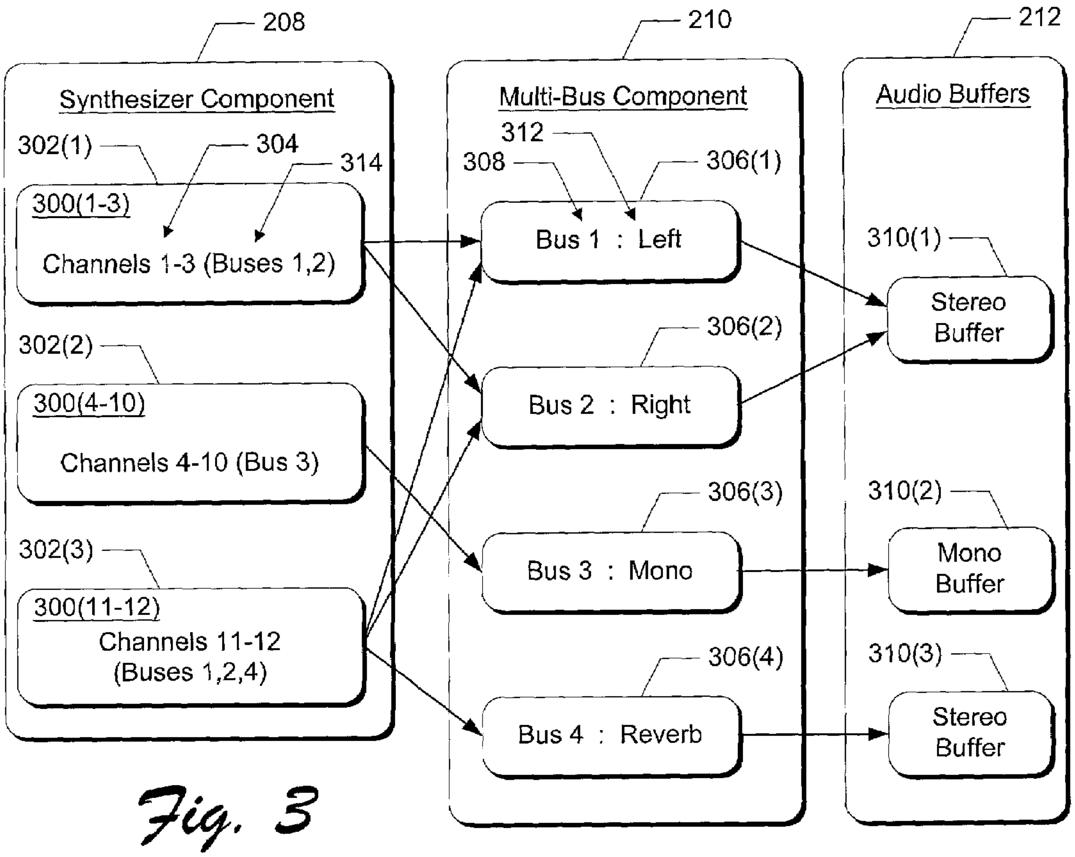
FIG. 3 is a block diagram that further illustrates components of the audio generation system shown in FIG. 2.

FIG. 3 illustrates various components of the audio generation system 200 in accordance with an implementation of the invention described herein. Synthesizer component 208 has synthesizer channels 300(1-12). A synthesizer channel 300 is a communications path in the synthesizer 208 represented by a channel object. A channel object has APIs to receive and process MIDI events to generate audio wave data that is output by the synthesizer channels.

The synthesizer channels 300 are grouped into channel sets 302(1-3) according to the destination of the audio wave data that is output from each channel 300. Each channel set 302 has a channel designator 304 to identify the channels 300 corresponding to a particular channel set 302 within the synthesizer 208. Channel set 302(1) includes synthesizer channels 300(1-3), channel set 302(2) includes synthesizer channels 300(4-10), and channel set 302(3) includes synthesizer channels 300(11-12).

Multi-bus component 210 has multiple logical buses 306(1-4). A logical bus 306 is a logic connection or data communication path for audio wave data. Each logical bus 306 has a corresponding bus identifier (busID) 308 that uniquely identifies a particular logical bus. The logical buses 306 are configured to receive audio wave data from the synthesizer channels 300 and route the audio wave data to audio buffers component 212.

The audio buffers component 212 includes three buffers 310(1-3) that are consumers of the audio wave data. The audio buffers 310 receive audio wave data output from the logical buses 306 in the multi-bus component 210. An audio buffer 310 receives an input of audio wave data from one or more logical buses 306, and streams the audio wave data in real-time to a sound card or similar audio rendering device. Alternatively, an audio buffer 310 can process the audio wave data input with various effects-processing components (i.e., audio processing components) that corresponds to a designated function of a particular audio buffer 310 before sending the audio data to be further processed and/or output as audible sound.

The audio buffers component 212 includes a two channel stereo buffer 310(1) that receives audio wave data input from logic buses 306(1) and 306(2), a single channel mono buffer 310(2) that receives audio wave data input from logic bus 306(3), and a single channel reverb stereo buffer 310(3) that receives audio wave data input from logic bus 306(4).

Each logical bus 306 has a corresponding bus function identifier (funcID) 312 that indicates the designated effects-processing function of the particular buffer 310 that receives the audio wave data output from the logical bus. For example, a bus funcID can indicate that the audio wave data output of a corresponding logical bus will be to a buffer 310 that functions as a left audio channel such as bus 306(1), a right audio channel such as bus 306(2), a mono channel such as bus 306(3), or a reverb channel such as bus 306(4). Additionally, a logical bus can output audio wave data to a buffer 310 that functions as a three-dimensional (3-D) audio channel, or output audio wave data to other types of effects-processing buffers.

Each channel set 302 in synthesizer 208 has a bus designator 314 to identify the logical buses 306 corresponding to a particular channel set 302. For example, synthesizer channels 300(1-3) of channel set 302(1) output audio wave data that is designated as input for audio buffer 310(1). Audio buffer 310(1) is a two channel stereo buffer, thus having two associated buses 306(1) and 306(2) that input audio wave data to the buffer. The channel set 302(1) bus designator 314 designates buses 1 and 2 as the destination for audio wave data output from channels 300(1-3) in the channel set.

Channel set 302(2) includes synthesizer channels 300(4-10) that output audio wave data designated as input for audio buffer 310(2). Audio buffer 310(2) is a single channel mono buffer and has one associated bus 306(3) that inputs audio wave data to the buffer. The channel set 302(2) bus designator 314 designates bus 3 as the destination for audio wave data output from synthesizer channels 300(4-10). Channel set 302(3) includes synthesizer channels 300(11-12) that output audio wave data designated as input for audio buffers 310(1) and 310(3). The channel set 302(3) bus designator 314 designates buses 1, 2, and 4 as the destination for audio wave data output from synthesizer channels 300(11-12).

A logical bus 306 can have more than one input, from more than one synthesizer, synthesizer channel, and/or audio source. A synthesizer 208 can mix audio wave data by routing one output from a synthesizer channel 300 to any number of logical buses 306 in the multi-bus component 210. For example, logical bus 306(1) has multiple inputs from synthesizer channels 300(1-3) and 300(11-12). Each logical bus 306 outputs audio wave data to one associated buffer 310, but a particular buffer 310 can have more than one input from different logical buses. For example, logical buses 306(1) and 306(2) output audio wave data to one designated buffer. The designated audio buffer 310(1), however, receives the audio wave data output from both buses.

Although the multi-bus component 210 is shown having only four logical buses 306(1-4), it is to be appreciated that the logical buses are dynamically created as needed, and released when no longer needed. Thus, the multi-bus component 210 can support any number of logical buses at any one time as needed to route audio wave data from the synthesizer 208 to the audio buffers 310. Similarly, it is to be appreciated that there can be any number of audio buffers 310 available to receive audio wave data at any one time. Furthermore, although the multi-bus component 210 is shown as an independent component, it can be integrated with the synthesizer component 208, or the audio buffers component 212.

Figure 4:
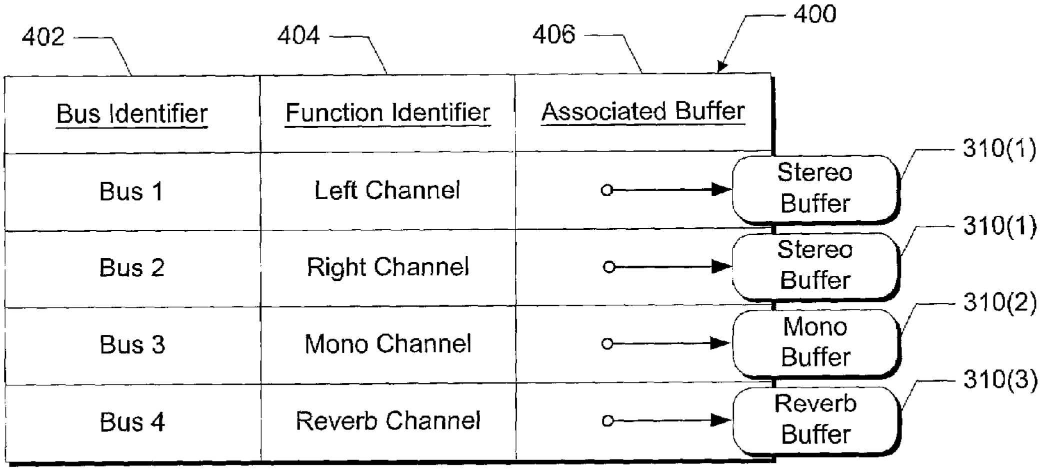
FIG. 4 is a block diagram of a data structure that correlates the components illustrated in FIG. 3.

FIG. 4 illustrates a bus active list 400 that is a data structure maintained by the computing device that implements the multi-bus component 210. The active list 400 is a bus-to-buffer mapping list having a plurality of mappings. Each mapping has a bus identifier (busID) 402, a function identifier (funcID) 404, and a pointer 406. Thus, each mapping associates a busID with a bus funcID. Additionally, active list 400 associates a pointer 406 to the buffer 310 that corresponds to a particular busID 402. Those skilled in the art will recognize that various techniques are available to implement the bus active list 400 as a data structure.

Audio wave data is routed from the synthesizer channels 300 to the audio buffers 310 based on a "pull model". That is, when an audio buffer 310 is available to receive audio wave data, the buffer requests output from the synthesizer 208. The synthesizer 208 receives the request for audio wave data from an audio buffer 310 along with a busID for the bus, or busIDs for the buses, that correspond to the buffer. The active list 400 is passed to the synthesizer 208 when a buffer 310 requests the audio wave data. The synthesizer 208 determines the associated funcID 404 of each logical bus corresponding to the available buffer and then designates which synthesizer channels 300 will output the audio wave data to the corresponding bus, or buses.

File Format and Component Instantiation

Configuration information for the synthesizer component 208, the multi-bus component 210, and the audio buffers component 212 is stored in a well-known format such as the Resource Interchange File Format (RIFF). A RIFF file includes a file header followed by what are known as "chunks." The file header contains data describing an audio buffer object, for example, such as a buffer identifier, descriptor, the buffer function and associated effects (i.e., audio processors), and corresponding busIDs.

Each of the chunks following a file header corresponds to a data item that describes the object, such as an audio buffer object effect. Each chunk consists of a chunk header followed by actual chunk data. A chunk header specifies an object class identifier (CLSID) that can be used for creating an instance of the object. Chunk data consists of the audio buffer effect data to define the audio buffer configuration.

Audio buffers are created in accordance with configurations defined by RIFF files. A RIFF file for a buffer configuration includes a buffer global unique identifier (buffer GUID), a buffer descriptor, and bus identifier (busID) data. The buffer GUID uniquely identifies each buffer. A buffer GUID can be used to determine which synthesizer channels connect to which buffers. By using a unique buffer GUID for each buffer, different synthesizer channels, and channels from different synthesizers, can connect to the same buffer or uniquely different ones, whichever is preferred.

The buffer descriptor defines how many audio channels a buffer will have as well as initial settings for volume, and the like. The busID data designates a logic bus, or buses, that connect to a particular buffer. There can be any number of logic buses connected to a particular buffer to input audio wave data. For example, stereo buffer 310(1) (FIG. 3) is a two channel stereo buffer and has two busIDs: a busID_LEFT corresponding to logic bus 306(1) and a busID_RIGHT corresponding to logic bus 306(2).

A RIFF file for a synthesizer configuration defines the synthesizer channels and includes both a synthesizer channel-to-buffer assignment list and a buffer configuration list stored in the synthesizer configuration data. The synthesizer channel-to-buffer assignment list defines the synthesizer channel sets and the buffers that are designated as the destination for audio wave data output from the synthesizer channels in the channel set. The assignment list associates buffers according to buffer GUIDs which are defined in the buffer configuration list.

Defining the buffers by buffer GUIDs facilitates the synthesizer channel-to-buffer assignments to identify which buffer will receive audio wave data from a synthesizer channel. Defining buffers by buffer GUIDs also facilitates sharing resources. More than one synthesizer can output audio wave data to the same audio buffer. When an audio buffer is instantiated, or provided, for use by a first synthesizer, a second synthesizer can output audio wave data to the buffer if it is available to receive data input. The buffer configuration list also maintains flag indicators that indicate whether a particular buffer can be a shared resource or not.

The buffer and synthesizer configurations support COM interfaces for reading and loading the data from a file. To instantiate, or provide, a synthesizer component 208 and/or an audio buffer 310, an application program 202 first instantiates a component using a COM function. The application program then calls a load method for a synthesizer object or a buffer object, and specifies a RIFF file stream. The object parses the RIFF file stream and extracts header information. When it reads individual chunks, it creates corresponding synthesizer channel objects or a buffer object based on the chunk header information. However, those skilled in the art will recognize that the audio generation systems and the various components described herein are not limited to a COM implementation, or to any other specific programming technique.

Method for an Exemplary Audio Generation System

Figure 5:
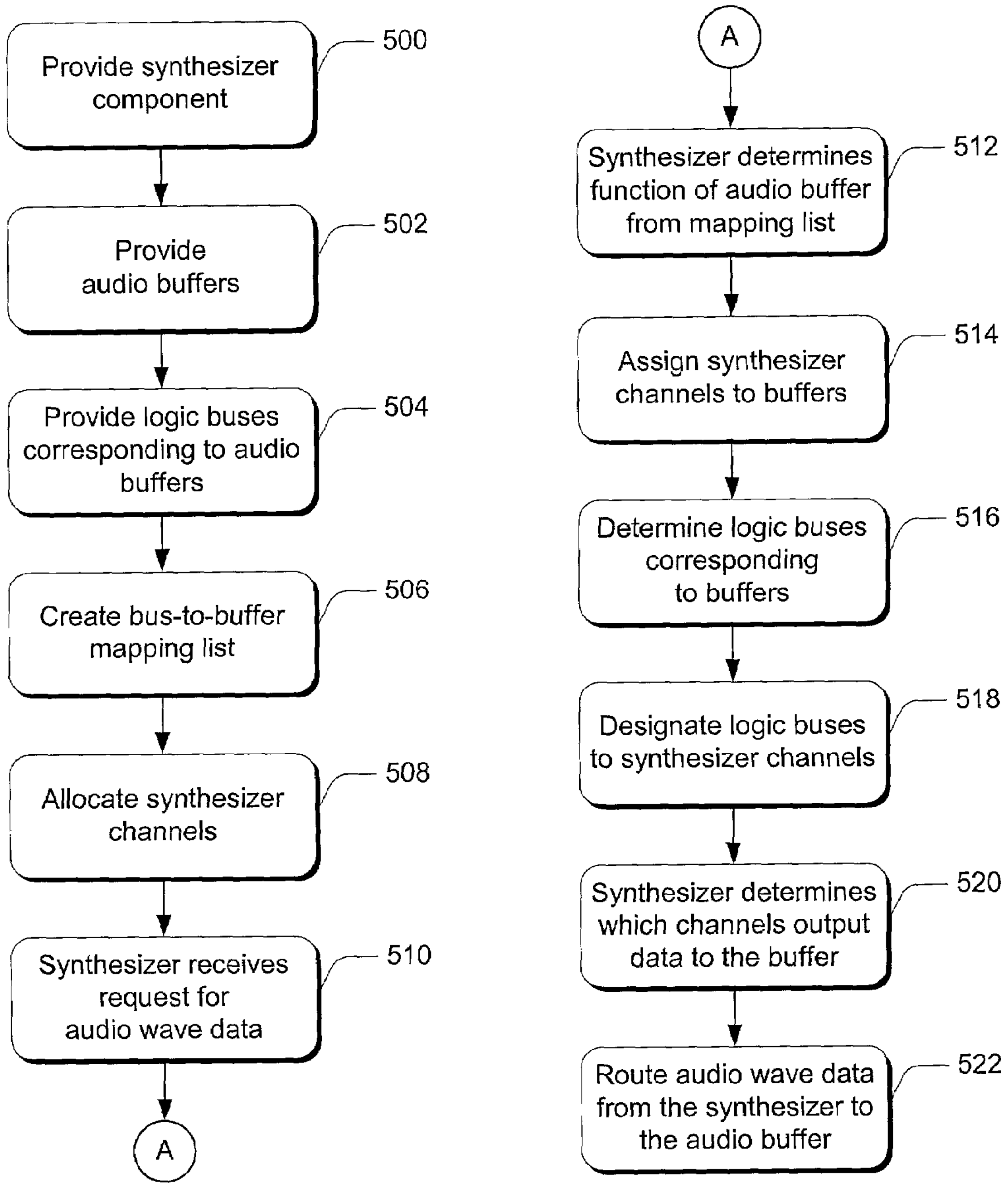
FIG. 5 is a flow diagram of a method for an audio generation system with a multi-bus component.

FIG. 5 illustrates a method for an audio generation system with a multi-bus component and refers to components described in FIGS. 2–4 by reference number. The order in which the method is described is not intended to be construed as a limitation. Furthermore, the method can be implemented in any suitable hardware, software, firmware, or combination thereof.

At block 500, a synthesizer component is provided. For example, the synthesizer component can be instantiated from a synthesizer configuration file format (e.g., a RIFF file as described above). A synthesizer component can also be created from a file representation that is loaded and stored in a synthesizer configuration object that maintains all of the information defined in the synthesizer configuration file format. Alternatively, a synthesizer component can be created directly by an audio rendition manager.

At block 502, audio buffers are provided. For example, the audio buffers can be instantiated from a buffer configuration file format (e.g., a RIFF file). Alternatively, an audio buffer component can be created from a file representation that is loaded and stored in a buffer configuration object that maintains all of the information defined in the buffer configuration file format. The information includes the number of buffer channels, a buffer GUID, and the busID data that indicates the funcID of each logical bus that connects to the audio buffer.

At block 504, a multi-bus component is provided having logical buses corresponding to the audio buffers created at block 502. For example, stereo buffer 310(1) is created and logical buses 306(1) and 306(2) corresponding to stereo buffer 310(1) are instantiated. At block 506, a bus-to-buffer mapping list, such as bus active list 400 for example, is created to reflect which logical buses correspond to an audio buffer.

At block 508, synthesizer channels are allocated in the synthesizer. The synthesizer channels can be allocated according to a synthesizer channel-to-buffer assignment list stored in the synthesizer configuration data. At block 510, the synthesizer (instantiated at block 500) receives a request from an audio buffer for audio wave data to process. The request for audio wave data includes the bus-to-buffer mapping list (created at block 506). At block 512, the synthesizer determines the function of the requesting audio buffer from the associated funcIDs for each corresponding logic bus listed in the bus-to-buffer mapping list.

At block 514, the synthesizer channels are assigned to buffers according to corresponding buffer GUIDs maintained in a buffer configuration list which is stored with the synthesizer configuration file data. At block 516, the synthesizer determines which logic buses correspond to each buffer that has been assigned to a synthesizer channel (at block 514). At block 518, the synthesizer associates a bus designator for each synthesizer channel to indicate which bus or buses correspond to a particular synthesizer channel audio wave data output. For example, bus designator 314 indicates that synthesizer channels 300(1-3) of channel set 302(1) are associated with logical buses 1 and 2.

At block 520, the synthesizer determines which synthesizer channels can output audio wave data to the audio buffer that has a function type defined by the funcID corresponding to the associated logical bus or buses. At block 522, audio data is routed from the synthesizer 208, through logical buses 306 in the multi-bus component 210, and to audio buffers 310 in the audio buffers component 212.

Exemplary Computing System and Environment

Figure 6:
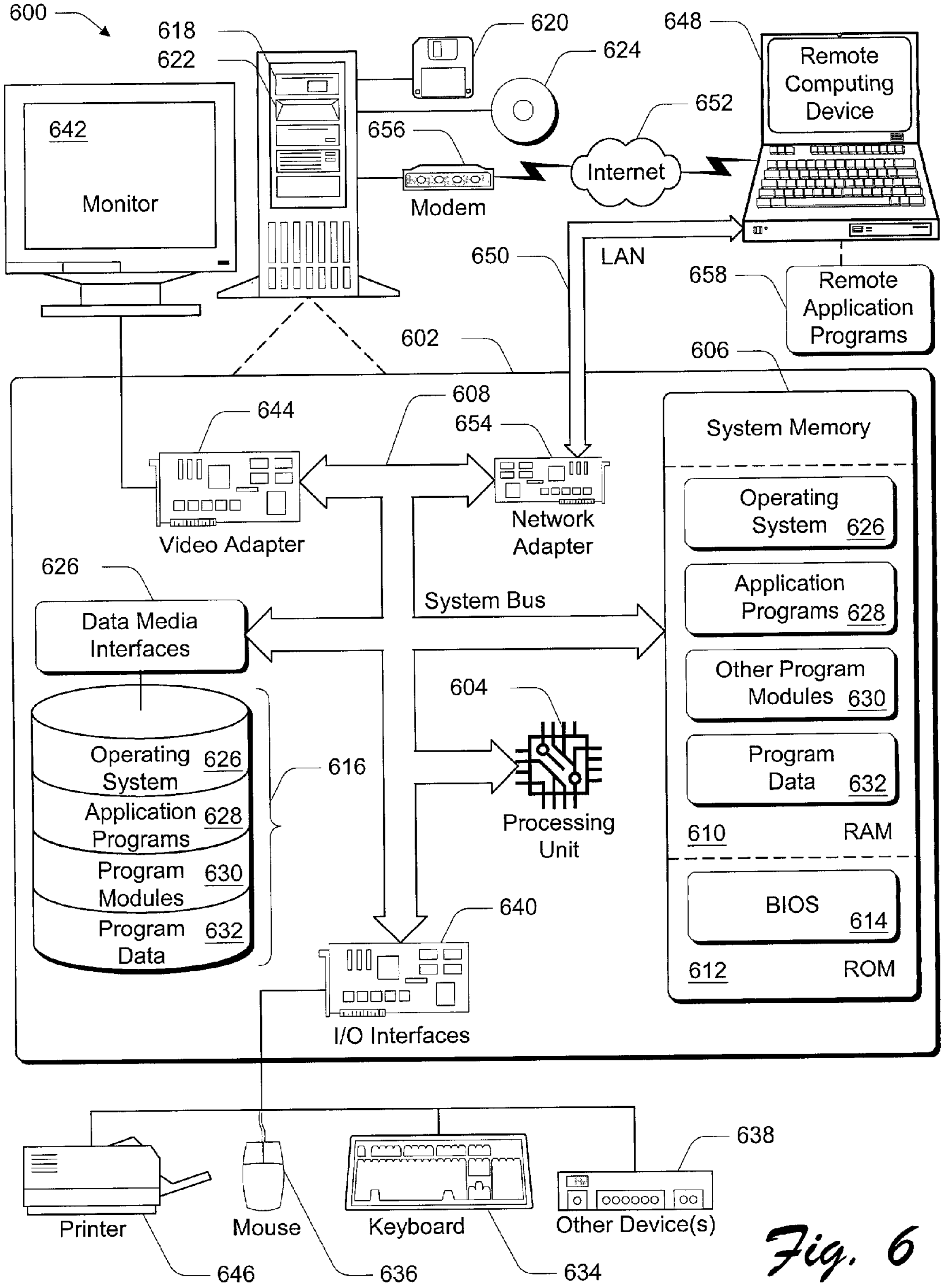
FIG. 6 is a diagram of computing systems, devices, and components in an environment that can be used to implement the invention described herein.

FIG. 6 illustrates an example of a computing environment 600 within which the computer, network, and system architectures described herein can be either fully or partially implemented. Exemplary computing environment 600 is only one example of a computing system and is not intended to suggest any limitation as to the scope of use or functionality of the network architectures. Neither should the computing environment 600 be interpreted as having any dependency or requirement relating to any one or combination of components illustrated in the exemplary computing environment 600.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Implementing a multi-bus component may be described in the general context of computer-executable instructions, such as program modules, being executed by a computer. Generally, program modules include routines, programs, objects, components, data structures, etc. that perform particular tasks or implement particular abstract data types. Implementing a multi-bus component may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing system in the form of a computer 602. The components of computer 602 can include, by are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 602 typically includes a variety of computer readable media. Such media can be any available media that is accessible by computer 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 can also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a “floppy disk”), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by a SCSI interface (not shown).

The disk drives and their associated computer-readable media provide nonvolatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a implementing a multi-bus component.

Computer system 602 can include a variety of computer readable media identified as communication media. Communication media typically embodies computer readable instructions, data structures, program modules, or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 602 via input devices such as a keyboard 634 and a pointing device 636 (e.g., a “mouse”). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

CONCLUSION

A synthesizer and multi-bus component allows an application program to specify, for example, unique 3-D positions for as many video entities as the application requires for audio representation corresponding to a video presentation. Specifically, this is accomplished by routing audio wave data from a synthesizer channel to multiple buffers via logic buses that connect to the multiple buffers having mixing and/or 3-D effects-processing.

Interfacing the synthesizer and the audio buffers with the logic buses of the multi-bus component allows for greater flexibility in routing the audio wave data generated by the synthesizer. The flexibility in routing also means that groups of instruments can be routed through different buffers with different effects-processing, or sound effects can be sub-mixed and routed to unique 3-D positions.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:

receiving a synthesizer MIDI instruction to generate multiple streams of audio wave data with a synthesizer software component;

receiving requests from audio data buffers to route the multiple streams of audio wave data from the synthesizer software component to the audio data buffers;

dynamically generating a plurality of logical buses instantiated as software components, the logical buses each corresponding to an audio data buffer;

assigning at least one audio wave data stream to a plurality of the logical buses;

routing any audio wave data stream assigned to a particular logical bus to the audio data buffer corresponding to said particular logical bus; and dynamically releasing at least one of the logical buses when no longer needed to route a stream of audio wave data.

2. A method as recited in claim 1, wherein a plurality of audio wave data streams are assigned to at least one of the logical buses.

3. A method as recited in claim 1, wherein each logical bus corresponds to a single audio data buffer.

4. A method as recited in claim 1, wherein at least two of the logical buses correspond to the same audio data buffer.

5. A method as recited in claim 1, wherein the audio data buffer performs an action of buffering audio wave data prior to outputting the audio wave data.

6. A method as recited in claim 1, wherein the audio data buffer performs an action of effects-processing the audio wave data prior to outputting the audio wave data.

7. A method as recited in claim 1, wherein said assigning comprises creating a data structure and correlating the logical buses with corresponding audio data buffers.

8. A method as recited in claim 1, wherein said assigning comprises creating a data structure and correlating the logical buses with corresponding audio data buffers, and wherein said routing comprises referring to the data structure.

9. A method as recited in claim 1, wherein said generating comprises instantiating a programming object to receive the multiple streams of audio wave data.

10. A method as recited in claim 1, wherein said dynamically generating comprises instantiating a programming object to receive the multiple streams of audio wave data, and wherein said routing comprises calling an interface of the programming object.

11. One or more computer-readable media comprising computer-executable instructions that, when executed, direct a computing system to perform the method of claim 1.

12. An audio generation system implemented in a computing device, the audio generation system comprising:

a plurality of audio wave data sources from which streams of audio wave data are generated by a synthesizer software component;

a plurality of audio wave data consumers configured to receive one or more of the streams of audio wave data;

a software component configured to:

dynamically generate logical buses instantiated as software components to route the streams of audio wave data to corresponding audio wave data consumers;

release at least one of the logical buses when no longer needed to route a steam of audio wave data to a corresponding audio wave data consumer; and receive one or more of the streams of audio wave data at each of the generated logical buses, and route any audio wave data that is received at a particular logical bus to an audio wave data consumer corresponding to said particular logical bus.

13. An audio generation system as recited in claim 12, wherein each logical bus corresponds to a single audio wave data consumer.

14. An audio generation system as recited in claim 12, wherein at least two of the logical buses correspond to the same audio wave data consumer.

15. An audio generation system as recited in claim 12, wherein a plurality of audio wave data streams are assigned to at least one of the logical buses.

16. An audio generation system as recited in claim 12, wherein an audio wave data consumer is a data buffer that buffers one or more of the streams of audio wave data.

17. An audio generation system as recited in claim 12, wherein an audio wave data consumer effects-processes one or more of the streams of audio wave data.

18. An audio generation system as recited in claim 12, wherein an audio wave data consumer is a data buffer that buffers one or more of the streams of audio wave data and effects-processes the buffered audio wave data.

19. An audio generation system as recited in claim 12, wherein the audio wave data sources are software components.

20. An audio generation system as recited in claim 12, wherein the audio wave data sources are programming objects having interfaces that are callable by a programmed application to generate the streams of audio wave data.

21. An audio generation system as recited in claim 12, wherein the streams of audio wave data are generated by at least an additional synthesizer software component.

22. An audio generation system as recited in claim 12, wherein a plurality of synthesizer software components generate the streams of audio wave data, wherein at least one of the synthesizer software components generates a plurality of outputs, and wherein respective ones of the outputs are provided to different respective logical buses.

23. An audio generation system, comprising:

a synthesizer software component configured to generate multiple streams of audio wave data in response to receiving one or more synthesizer MIDI instructions;

a plurality of audio data buffers configured to receive the multiple streams of audio wave data;

a software component configured to dynamically generate a plurality of logical buses instantiated as software components to route the multiple streams of audio wave data, an individual logical bus configured to correspond to an audio data buffer, receive one or more of the streams of audio wave data, and route the one or more streams of audio wave data to the audio data buffer; and wherein the synthesizer software component is further configured to route at least one of the streams of audio wave data to different ones of the logical buses.

24. An audio generation system as recited in claim 23, wherein a second logical bus is configured to correspond to the audio data buffer, receive one or more additional streams of audio wave data, and route the one or more additional streams of audio wave data to the audio data buffer.

25. An audio generation system as recited in claim 23, wherein the synthesizer software component has a channel that generates a stream of audio wave data and that is configurable to route the stream of audio wave data to the individual logical bus and is further configured to dynamically release at least one of the logical buses when no longer needed.

26. An audio generation system as recited in claim 23, wherein the synthesizer software component has a channel that generates a stream of audio wave data and that is configurable to route the stream of audio wave data to a plurality of the logical buses, and wherein the logical buses receive the stream of audio wave data and route the stream of audio wave data to a plurality of corresponding audio data buffers.

27. An audio generation system as recited in claim 23, wherein the synthesizer software component has a plurality of channels that each generate a stream of audio wave data and that are configurable to route at least one of the streams of audio wave data to a plurality of the logical buses, and wherein the logical buses receive the streams of audio wave data and route the streams of audio wave data to a plurality of corresponding audio data buffers.

28. An audio generation system as recited in claim 23, further comprising a second synthesizer software component configured to generate additional streams of audio wave data, and wherein the individual logical bus is configured to receive one or more of the additional steams of audio wave data and route the additional streams of audio wave data to the audio data buffer.

29. An audio generation system as recited in claim 23, further comprising a second synthesizer software component configured to generate additional streams of audio wave data, and wherein a second logical bus is configured to correspond to the audio data buffer, receive one or more of the additional streams of audio wave data, and route the additional streams of audio wave data to the audio data buffer.

30. An audio generation system as recited in claim 23, further comprising a data structure to correlate which of the logical buses correspond to an audio data buffer.

31. An audio generation system as recited in claim 23, further comprising a data structure to correlate which of the logical buses correspond to an audio data buffer, wherein the audio data buffer receives streams of audio wave data from the corresponding logical buses.

32. A computer-based audio generation system, comprising:

a plurality of logical bus objects instantiated as software components configured to receive audio wave data, wherein each logical bus object corresponds to an audio data buffer, wherein each logical bus object is dynamically generated to route the audio wave data to a corresponding audio data buffer, and wherein at least one of the logical bus objects can be dynamically released when no longer needed to route a stream of audio wave data;

a data structure that correlates each logical bus object according to a function of an audio data buffer that corresponds to a logical bus object; and wherein one or more streams of audio wave data are assigned to a logical bus object based on the function of an audio data buffer that corresponds to the logical bus object.

33. A computer-based audio generation system as recited in claim 32, wherein a logical bus object receives one or more of the assigned audio wave data streams and routes the audio wave data streams to the corresponding audio data buffer.

34. A computer-based audio generation system as recited in claim 32, further comprising a synthesizer that generates a plurality of streams of audio wave data, wherein at least one of the streams of audio wave data is provided to different respective logical buses.

35. A computer-based audio generation system as recited in claim 32, further comprising a synthesizer that generates the one or more streams of audio wave data in response to a MIDI instruction.

36. A computer-based audio generation system as recited in claim 32, further comprising an audio wave data generation object configured to receive audio content and an instruction to generate the one or more streams of audio wave data.

37. A computer-based audio generation system as recited in claim 32, wherein each logical bus object corresponds to a single audio data buffer.

38. A computer-based audio generation system as recited in claim 32, wherein at least two of the logical bus objects correspond to the same audio data buffer.

39. A computer-based audio generation system as recited in claim 32, wherein a plurality of audio wave data streams are assigned to at least one of the logical bus objects.

40. A data structure for an audio processing system implemented in a computing device, comprising:

a bus identifier parameter to uniquely identify a logical bus that is dynamically instantiated as a software component, and that corresponds to an audio data buffer;

a function identifier parameter to identify an effects-processing function of the audio data buffer;

a programming reference to identify the audio data buffer; and wherein at least one stream of audio wave data is routed to a plurality of different logical buses, the bus identifier parameter being defined according to the function identifier parameter of the corresponding audio data buffer.

41. A method, comprising:

generating one or more streams of audio wave data with an audio wave data generation software component when receiving audio content and a MIDI instruction;

providing an audio data buffer configured to receive the one or more streams of audio wave data;

dynamically generating logical bus components instantiated as software components configured to route the one or more streams of audio wave data to the audio data buffer; and dynamically releasing at least one of the logical bus components when no longer needed to route a stream of audio wave data.

42. A method as recited in claim 41, wherein the audio wave data generation software component is a synthesizer.

43. A method as recited in claim 41, wherein the audio data buffer performs an action of buffering audio wave data.

44. A method as recited in claim 41, wherein the audio data buffer performs an action of effects-processing the audio wave data.

45. A method as recited in claim 41, further comprising assigning a given one of the streams of audio wave data to a plurality of different logical bus components.

46. A method as recited in claim 41, further comprising assigning one or more of the streams of audio wave data to the logical bus component.

47. One or more computer-readable media comprising computer-executable instructions that, when executed, direct a computing system to perform the method of claim 41.

48. A method, comprising:

receiving a synthesizer MIDI instruction to generate multiple streams of audio wave data with a synthesizer software component;

dynamically generating logical buses instantiated as software components, the logical buses each corresponding to an audio data buffer;

creating a data structure and designating which of the logical buses correspond to respective audio data buffers;

assigning at least one of the multiple streams of audio wave data to a plurality of the logical buses;

routing an audio wave data stream assigned to a particular logical bus to the audio data buffer corresponding to said particular logical bus; and dynamically releasing at least one of the logical buses when no longer needed to route the audio wave data stream to the audio data buffer.

49. A method as recited in claim 48, wherein a plurality of audio wave data streams are assigned to at least one of the logical buses.

50. A method as recited in claim 48, wherein each logical bus corresponds to a single audio data buffer.

51. A method as recited in claim 48, wherein at least two of the logical buses correspond to the same audio data buffer.

52. One or more computer-readable media comprising computer-executable instructions that, when executed, direct a computing system to perform the method of claim 48.

* * * * *

UNITED STATES PATENT AND TRADEMARK OFFICE

CERTIFICATE OF CORRECTION

PATENT NO. : 7,089,068 B2
APPLICATION NO. : 09/802111
DATED : August 8, 2006
INVENTOR(S) : Fay et al.

It is certified that error appears in the above-identified patent and that said Letters Patent is hereby corrected as shown below:

On the Title page, Item (56), under "Other Publications", in column 2, line 2, delete "Enviornment" and insert -- Environment --, therefor.

On Title page 2, Item (56), under "Other Publications", in column 1, line 16, delete "et al;" and insert -- et al.; --, therefor.

On Title page 2, Item (56), under "Other Publications", in column 1, line 21, delete "Institue" and insert -- Institute --, therefor.

On Title page 2, Item (56), under "Other Publications", in column 2, line 15, delete "V. ," and insert -- V., --, therefor.

On Title page 2, Item (56), under "Other Publications", in column 2, line 15, delete "Sornoric" and insert -- Sonoric --, therefor.

On Title page 2, Item (56), under "Other Publications", in column 2, line 21, delete "et al. ,"CAMP:" and insert -- et al., "CAMP: --, therefor.

On Title page 2, Item (56), under "Other Publications", in column 2, line 30, delete "H. ,"Sound" and insert -- H., "Sound --, therefor.

In column 3, line 8, delete "DirectMusict®" and insert -- DirectMusic® --, therefor.

In column 11, line 20, delete "nonvolatile" and insert -- non-volatile --, therefor.

In column 14, line 6, in Claim 12, delete "steam" and insert -- stream --, therefor.

In column 15, line 30, in Claim 28, delete "steams" and insert -- streams --, therefor.

Signed and Sealed this

Thirteenth Day of April, 2010

David J. Kappos

*Director of the United States Patent and Trademark Office*